(12) United States Patent
Zientarski

(10) Patent No.: US 8,863,861 B2
(45) Date of Patent: Oct. 21, 2014

(54) DOWNHOLE TELEMETRY APPARATUS AND METHOD

(76) Inventor: Mariusz Thomas Zientarski, Priddis Alberta (CA)

( * ) Notice: Subject to any disclaimer, the term of this patent is extended or adjusted under 35 U.S.C. 154(b) by 1310 days.

(21) Appl. No.: 12/542,060

(22) Filed: Aug. 17, 2009

(65) Prior Publication Data

US 2010/0065329 A1    Mar. 18, 2010

Related U.S. Application Data

(60) Provisional application No. 61/089,247, filed on Aug. 15, 2008.

(51) Int. Cl.
*E21B 47/12*    (2012.01)
*G01V 11/00*    (2006.01)

(52) U.S. Cl.
CPC .............. *G01V 11/002* (2013.01); *E21B 47/12* (2013.01)
USPC .............. 175/50; 175/24; 166/66; 340/854.3

(58) Field of Classification Search
USPC ..................... 166/248, 66; 175/50; 340/854.3
See application file for complete search history.

(56) References Cited

U.S. PATENT DOCUMENTS

| | | | |
|---|---|---|---|
| 2,354,887 A * | 8/1944 | Silverman et al. | 340/854.6 |
| 2,389,241 A * | 11/1945 | Silverman | 340/854.5 |
| 6,614,360 B1 | 9/2003 | Leggett et al. | |
| 6,781,521 B1 | 8/2004 | Gardner et al. | |
| 7,035,165 B2 | 4/2006 | Tang | |
| 7,084,782 B2 * | 8/2006 | Davies et al. | 340/854.4 |

* cited by examiner

*Primary Examiner* — Giovanna Wright
*Assistant Examiner* — Taras P Bemko
(74) *Attorney, Agent, or Firm* — Ostrolenk Faber LLP

(57) ABSTRACT

A telemetry tool having position and direction sensors, a power supply, a signal receiver and a signal emitter is mounted in a drill string adjacent to a drill bit. A base unit at the surface generates, and transmits into the geological formation, a carrier signal, which may be a DC carrier signal. The geological formation provides a current path between the carrier current generator and the downhole end at which a portion of the carrier current is received by the telemetry tool. The drill string defines a relatively low resistance return signal conductor. The telemetry unit superimposes a time varying signal on the carrier current. The time varying signal includes a recognition sequence, followed by a data string which may include compass direction, azimuth dip, rotational speed, acceleration, and so on. The base unit strips the signal off the carrier current, and reads the code.

23 Claims, 3 Drawing Sheets

DOWNHOLE TELEMETRY APPARATUS AND METHOD

FIELD OF THE INVENTION

This invention relates to the field of downhole telemetry apparatus, and methods of use of such apparatus.

BACKGROUND

The determination of the location of a distant subterranean object may be of considerable commercial importance in the fields of well drilling, tunnel boring, pipeline laying under rivers or other surface obstructions, hard rock mining, and so on. In hydrocarbon extraction, a drill string may be 3 to 6 inches in diameter, and yet may extend many thousands of feet into the ground. Given the non-homogeneity of the underlying geological structure, and the tendency for drill bits to wander, it may be difficult to know with reasonable accuracy where the drill bit may be. This issue may tend to have enhanced importance in the context of, for example, directional drilling, where it may be desired to follow a relatively narrow and possibly undulating geological feature, such as a coal seam, a hydrocarbon payzone for oil or gas extraction, an ore vein or pipe, such as a kimberlite pipe from which a mineral or other resource is to be extracted, or the boring of a utility conduit in an urban area.

There are known methods of addressing these issues, sometimes termed borehole telemetry. A typical system might involve magnetic sensors that indicate azimuth angle (i.e., compass direction relative to North) and angle of dip. Gyroscopic (i.e., inertial) and magnetic sensors have been used for some time. Adjustments in drilling may occur on the basis of these signals. It may also be noted that while borehole telemetry may pertain to the absolute position of a drill head, it may also refer to, and have significant commercial importance in relation to, the relative position of one bore hole to another, as in steam assisted gravity drainage (SAGD) or of bore position relative to a geological boundary structure. This problem is discussed in U.S. Pat. No. 7,084,782 of Davies et al., issued Aug. 1, 2006, generally from col. 1, line 16 to col. 5, line 17, and particularly at column 2, lines 3-53, all of which is incorporated herein by reference. Among other items, Davies at el., note that:

(a) The drilling operation, and mud motor life, may be optimized by the real time transmission of, and adjustment of drilling operations in response to, measurement data of natural gamma rays, borehole inclination, borehole pressure, resistivity of the formation and, mud motor bearing temperature, and weight on the bit.

(b) When used with a downhole motor, the mud pulse telemetry system is typically located above the mud motor so that it is spaced a substantial distance from the drilling bit to protect the electronic components from the effects of vibration. As a result, the measured environmental data may not necessary correlate with the actual conditions at the drilling bit. A conventional telemetry system may have a depth lag (i.e., a distance offset) of up to or greater than 60 feet. It is possible to drill out of a hydrocarbon producing formation before detecting the exit, resulting in the need to drill several meters of borehole to get back into the pay zone. The interval drilled outside of the pay zone results in lost production revenue and may include wasted costs for completing that non-producing interval.

(c) Near bit sensor systems have been developed to provide early detection of changes to the formation while drilling, but may still be located a spaced distance from the drill bit assembly, giving a lag in determination of formation changes. Mounting sensors in a mud motor may be very costly and may reduce system reliability.

(d) Systems permitting relatively high rate, bi-directional, data transmission have been developed for sending data to the surface through an electrical line. However, a drill string wireline or cable is subject to stress at pipe connections; may be prone to wear, damage or destruction during normal drilling operations; and may be somewhat unreliable and prone to failure.

(e) Systems have also been developed for the downhole generation and transmission of acoustic or seismic signals or waves through the drill string or surrounding formation. However, a relatively large amount of downhole power is typically required to generate sufficient signal strength for surface detection. A relatively large power source must be provided or repeaters can be used at intervals along the string to boost the signal as it propagates.

This problem is also discussed in U.S. Pat. No. 7,035,165 of Tang, at col. 1, line 35 to col. 2, line 5: "Recently, horizontal boreholes, extending several thousand meters ("extended reach" boreholes), have been drilled to access hydrocarbon reserves at reservoir flanks and to develop satellite fields from existing offshore platforms. Even more recently, attempts have been made to drill boreholes corresponding to three-dimensional borehole profiles. Such borehole profiles often include several bends and turns along the drill path. Such three dimensional borehole profiles allow hydrocarbon recovery from multiple formations and allow optimal placement of wellbores in geologically intricate formations."

"Hydrocarbon recovery can be maximized by drilling the horizontal and complex wellbores along optimal locations within the hydrocarbon-producing formations (payzones). Crucial to the success of these wellbores is (1) to establish reliable stratigraphic position control while landing the wellbore into the target formation and (2) to properly navigate the drill bit through the formation during drilling. In order to achieve such wellbore profiles, it is important to determine the true location of the drill bit relative to the formation bed boundaries and boundaries between the various fluids, such as the oil, gas and water.

"Modern directional drilling systems usually employ a drill string having a drill bit at the bottom that is rotated by a drill motor (commonly referred to as the "mud motor"). A plurality of sensors and MWD devices are placed in close proximity to the drill bit to measure certain drilling, borehole and formation evaluation parameters. Such parameters are then utilized to navigate the drill bit along a desired drill path. Typically, sensors for measuring downhole temperature and pressure, azimuth and inclination measuring devices and a formation resistivity measuring device are employed to determine the drill string and borehole-related parameters. The resistivity measurements are used to determine the presence of hydrocarbons against water [ . . . ] a short distance in front of the drill bit. Resistivity measurements are most commonly utilized to navigate or "geosteer" the drill bit."

"Thus, the relative position uncertainty of the wellbore being drilled and the important near-wellbore bed boundary or contact is defined by the accuracy of the MWD directional survey tools and the formation dip uncertainty. MWD tools are deployed to measure the earth's gravity and magnetic field to determine the inclination and azimuth. Knowledge of the course and position of the wellbore depends entirely on these two angles. Under normal operating conditions, the inclination measurement accuracy is approximately plus or minus 0.2.degree. Such an error translates into a target location uncertainty of about 3.0 meters per 1000 meters along the borehole. Additionally, dip rate variations of several degrees are common. The optimal placement of the borehole is thus very difficult to obtain based on the currently available MWD measurements, particularly in thin pay zones, dipping formation and complex wellbore designs."

Commentary on downhole telemetry is also provided in U.S. Pat. No. 6,781,521, of Gardner et al., which issued on Aug. 24, 2004 in the context of transmitting downhole data to the surface during measurement while drilling (MWD) (See col. 1, line 46 to col. 2, line 57, in part as follows):

"At present, there are four major categories of telemetry systems that have been used in an attempt to provide real time data from the vicinity of the drill bit to the surface; namely, mud pressure pulses, insulated conductors, acoustics and electromagnetic waves."

"In a mud pressure pulse system, the resistance of mud flow through a drill string is modulated by means of a valve and control mechanism mounted in a special drill collar near the bit. This type of system typically transmits at 1 bit per second as the pressure pulse travels up the mud column at or near the velocity of sound in the mud. It is well known that mud pulse systems are intrinsically limited to a few bits per second due to attenuation and spreading of pulses."

"Insulated conductors, or hard wire connection from the bit to the surface, is an alternative method for establishing downhole communications. This type of system is capable of a high data rate and two way communication is possible. It has been found, however, that this type of system requires a special drill pipe and special tool joint connectors which substantially increase the cost of a drilling operation. Also, these systems are prone to failure as a result of the abrasive conditions of the mud system and the wear caused by the rotation of the drill string."

"Acoustic systems have provided a third alternative. Typically, an acoustic signal is generated near the bit and is transmitted through the drill pipe, mud column or the earth. It has been found, however, that the very low intensity of the signal which can be generated downhole, along with the acoustic noise generated by the drilling system, makes signal detection difficult. Reflective and refractive interference resulting from changing diameters and thread makeup at the tool joints compounds the signal attenuation problem for drill pipe transmission."

"The fourth technique used to telemeter downhole data to the surface uses the transmission of electromagnetic waves through the earth. A current carrying downhole data signal is input to a toroid or collar positioned adjacent to the drill bit or input directly to the drill string. When a toroid is utilized, a primary winding, carrying the data for transmission, is wrapped around the toroid and a secondary is formed by the drill pipe. A receiver is connected to the ground at the surface where the electromagnetic data is picked up and recorded. It has been found, however, that in deep or noisy well applications, conventional electromagnetic systems are unable to generate a signal with sufficient intensity to be recovered at the surface."

"In general, the quality of an electromagnetic signal reaching the surface is measured in terms of signal to noise ratio. As the ratio drops, it becomes more difficult to recover or reconstruct the signal. While increasing the power of the transmitted signal is an obvious way of increasing the signal to noise ratio, this approach is limited by batteries suitable for the purpose and the desire to extend the time between battery replacements. It is also known to pass band filter received signals to remove noise out of the frequency band of the signal transmitter. These approaches have allowed development of commercial borehole electromagnetic telemetry systems which work at data rates of up to four bits per second and at depths of up to 4000 feet without repeaters in MWD applications. It would be desirable to transmit signals from deeper wells and with much higher data rates which will be required for logging while drilling, LWD, systems."

The problem of transmitting encoded data by acoustic signals is also discussed in U.S. Pat. No. 6,614,360 of Leggett et al., issued Sep. 2, 2003, who suggest that much preliminary data processing may occur downhole (See col. 3, line 60 to col. 4, line 30).

The art discusses efforts to address the downhole signal strength or signal attenuation issue either by using acoustic repeaters, or by filtering out, or cancelling out either acoustic or EM noise. U.S. Pat. No. 6,781,521 of Gardner appears to be fairly sophisticated in this regard. Techniques of the nature of those described by Gardner tend to be directed toward the problem of identifying a signal where the signal to noise ratio is very small, perhaps of the order of a few thousandths.

SUMMARY OF THE INVENTION

In an aspect of the invention there is a telemetry apparatus that has an internal power source as in conventional electromagnetic systems, be it a battery or a generator, that is a part of the downhole MWD tool, but that also employs a larger, more powerful external electrical power source whose power plant is located elsewhere, such as at the surface. That external power source is used to create a carrier current in the drill string, or such like, upon which the internal power source can place an information signal.

In that aspect of the invention, the information placed onto the carrier current may have the for of one or both of (a) a signal superimposed on the carrier current; and (b) a modification of the carrier current, the modification being achieved by varying one of resistance, capacitance, or inductance in the current path.

In an aspect of the invention there is a telemetry apparatus for a drilling rig, the drilling rig having a drill string extending between a well head and a drill bit down a well bore formed in a geological formation. The telemetry apparatus includes a telemetry module locatable in a drill string adjacent to a drill bit, and one of (a) a current source operable to emit an electrical carrier current, that current source being located in a position to pass the carrier current into the geological formation and thence into the drill bit; and the telemetry module including apparatus operable to encode an information carrying signal onto the carrier current; and (b) a current source mounted to apply an electrical charging current to the drill string, whence that electrical current can pass from the drill bit into the geological formation; the current source being operable to electrically charge the geological formation; the current source being operable to permit an electrical discharge current from the geological formation to pass through the drill bit; at least one of the charging current and the discharge current defining a carrier current; and the telemetry module including apparatus operable to encode an information carrying signal onto said carrier current.

In another feature of that aspect of the invention, the apparatus includes a decoder located distant from the telemetry module, the decoder being connected to observe the encoded information carrying signal transported by the carrier current. In a further feature, the power source is an alternating current source and has a carrier current frequency range of less than 10 Hz. In another feature the power source is a direct current power source. In still another feature the decoding apparatus is located closer to the well head than to the drill bit. In yet another feature the apparatus includes an electrical conductor connected to the current source, the electrical conductor being operable to pass the carrier current into the geological formation from a downhole location in another well bore. In still another feature, the telemetry module includes batteries, the batteries providing a power source used in generating the information carrying signal. In a further feature of that additional feature, the batteries define a power source less powerful than the current source.

In another aspect of the invention, there is a method of obtaining wellbore telemetry information from a well bore telemetry tool, the telemetry tool being located proximate to a drill bit of a drill string in a well bore in a geological formation. The method includes one of (a) generating a carrier current elsewhere than at the telemetry tool; passing the carrier current through at least a portion of the geological formation and into the drill string; modifying the carrier current to transport encoded observed telemetry data from the telemetry tool; and receiving the modified carrier current with the encoded observed telemetry data at a location remote from the telemetry tool and (b) generating an electrical current at a current source elsewhere than at said telemetry tool; passing the electrical current along the drill string and into at least a portion of the geological formation near the drill bit to impose a capacitive charge in the geological formation near the drill bit, the electrical current so passed defining an electrical charging current; permitting at least a partial electrical discharge of the geological formation near the drill bit into the drill string, electrical current of said electrical discharge defining an electrical discharge current; at least one of said electrical charging current and said electrical discharging current defining a carrier current; modifying the carrier current to transport encoded observed telemetry data from the telemetry tool; and receiving the modified carrier current with the encoded observed telemetry data at a location remote from the telemetry tool.

In another feature of that aspect of the invention, the well bore has a well head, and the method includes receiving the modified carrier current at a location nearer to the well head than to the well bore. In a further additional feature the method includes decoding the modified carrier current at the well head, and signaling changes in steering of the drill bit on the basis of the observed telemetry data. Still another feature includes generating a direct current carrier current. Yet another feature includes generating an alternating current carrier current having a frequency of less than 100 Hz. In a narrower feature the method includes generating an alternating current carrier current that has a frequency of less than 10 Hz. In another feature the method includes locating the carrier current source near or at the well head of the well bore. In still another feature the method includes conducting the carrier current down a neighboring well bore and into the geological formation.

In another aspect of the invention there is a method of transmitting downhole an electrical signal carrying downhole telemetry information from a telemetry sending apparatus located near a drill bit of a drill string, the drill bit being downhole in a well bore formed in a geological formation. The signal is sent from the sending apparatus to a location near a well head of the well bore. The method includes establishing a carrier current in the drill string, and superposing the electrical signal on the carrier current.

In another feature of that aspect of the invention, the carrier current has a current magnitude that is more than 100 times as large as the peak current magnitude of the electrical signal. In another feature the carrier current has a value of greater than 0.5 amps. In still another feature the method includes employing a power supply adjacent to the well head to supply power for the carrier current. In a still further feature, the method includes building up a stored charge in the geological formation adjacent to the drill bit. In yet another feature the method includes discharging the geological formation through the drillstring, and placing the electrical signal on an electrical discharge current associated with that discharge.

In another aspect of the invention there is a method of obtaining data from a signal sending device in a downhole location in a well bore, wherein the signal sending device has an electrical signal generator, and the method includes providing power from a source remote from the downhole location to facilitate transmission from the signal sending device.

In still another aspect of the invention there is an apparatus for enhancing an electrical signal from a downhole telemetry tool. The apparatus is located in a well bore distant from the well head. The apparatus includes a signal sending tool mounted adjacent to a drill bit in a drill string and a power source located nearer to the well head than to the drill bit. The power source is operable to provide power to facilitate transmission of a signal from the signal sending tool to the well head.

BRIEF DESCRIPTION OF THE ILLUSTRATIONS

The invention may be explained with the aid of the accompanying illustrations, in which.

DETAILED DESCRIPTION

Figure 1:
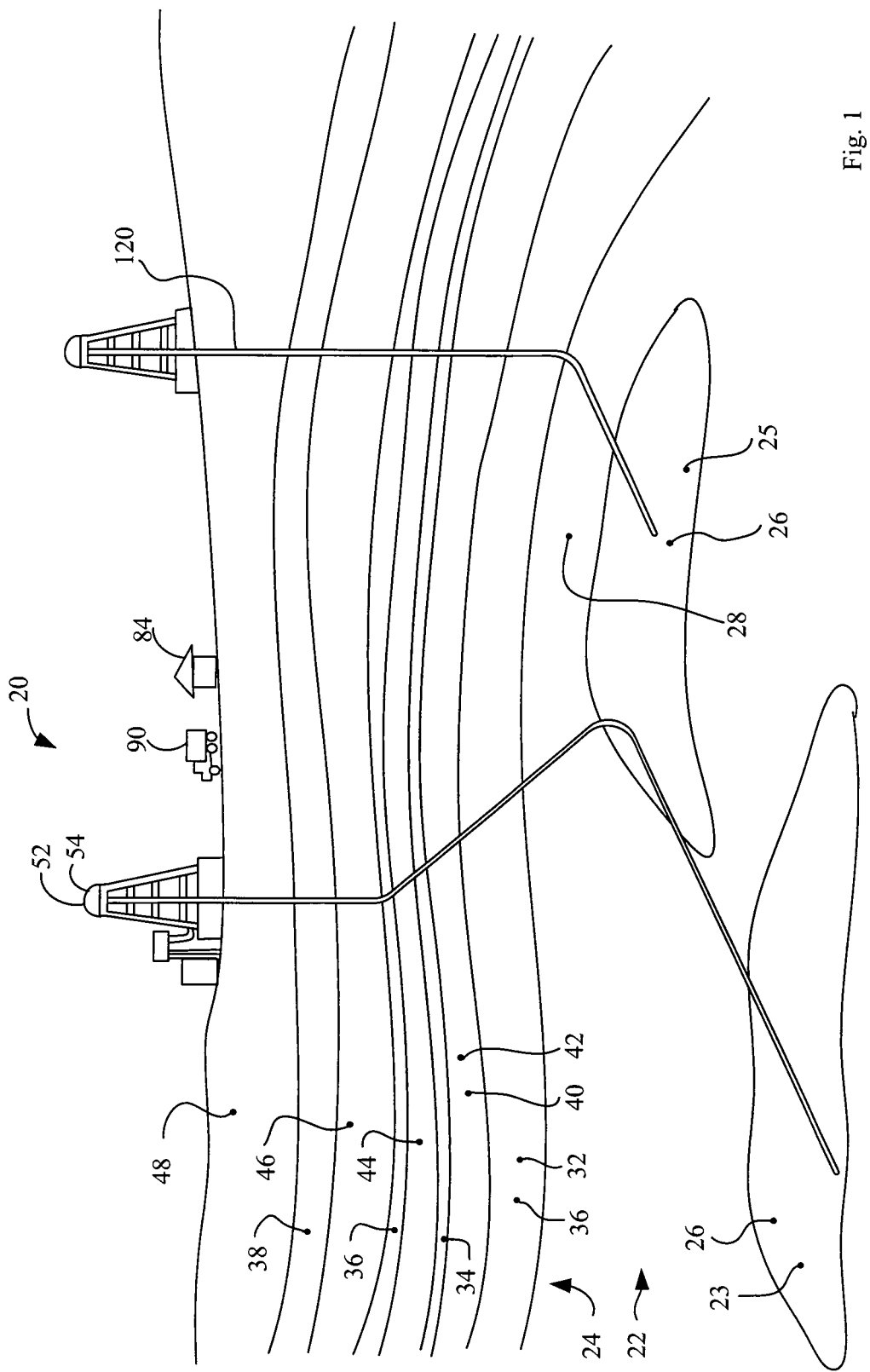
FIG. 1 is a general representation in cross-section of a geological formation establishing an example of a context to which the description that follows may apply, and includes an embodiment of drill rig downhole telemetry apparatus incorporating aspects of the present invention.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale.

The terminology used in this specification is thought to be consistent with the customary and ordinary meanings of those terms as they would be understood by a person of ordinary skill in the art in North America. Following from the decision of the Court of Appeal for the Federal Circuit in *Phillips* v. *AWH Corp.*, and while not excluding interpretations based on other sources that are generally consistent with the customary and ordinary meanings of terms or with this specification, or both, the Applicant expressly excludes all interpretations that are inconsistent with this specification, and, in particular, expressly excludes any interpretation of the claims or the language used in this specification such as may originate in the USPTO, or in any other Patent Office, unless supported by this specification or by objective evidence of record in accordance with In re Lee, such as may demonstrate how the terms are used and understood by persons of ordinary skill in the art, or by way of expert evidence of a person or persons of experience in the art.

In terms of general orientation and directional nomenclature, two types of frames of reference may be employed. First, inasmuch as this description pertains to drill bits that most typically are driven rotationally about an axis of rotation, and that advance along that axis, and although a well may not necessarily be drilled vertically, terminology may be employed assuming a cylindrical polar co-ordinate system in which the nominally vertical, or z-axis, may be taken as running along the bore of the well, and may be defined by the axis of rotation of the drill bit or the centerline of the bore. The circumferential direction is that through which angles, angular velocity, and angular accelerations, (typically theta, omega and alpha) may be measured, often from an angular datum, or angular direction, in a plane perpendicular to the axial direction. The radial direction is defined in the plane to which the axial direction is normal, may be taken as having the centerline of the bore as the origin, that bore being taken as being, at least locally, the center of a cylinder whose length is many times its width, with all radial distances being measured away from that origin.

The second type of terminology uses the well head as a point of reference. While there is a local polar-cylindrical co-ordinate system, the bore need not be straight, and in horizontal or directional drilling is unlikely to be straight, but may tend to curve or deviate, and may do so deliberately according to deliberate steering. In this context, the bore may have an azimuth or compass direction, an angle of inclination (i.e., a dip angle), and may proceed on a given radius of curvature, which itself may vary. In this frame of reference, "upstream" may generally refer to a point that is further away from the outlet of the well, and "downstream" may refer to a location or direction that is closer to, or toward, the outlet of the well. In this terminology, "up" and "down" may not necessarily be vertical, given that slanted and horizontal drilling may occur, but may be used as if the well bore had been drilled vertically, with the well head being above the bottom of the well. In this terminology, it is understood that production fluids flow up the well bore to the well head at the surface. Finally, it may be desired to convert from this frame of reference to a grid or map reference with a depth, which, though formally a polar co-ordinate system (latitude, longitude, and depth) is, at the scale of interest essentially Cartesian (two horizontal grid references, plus a vertical reference for depth).

Figure 2:
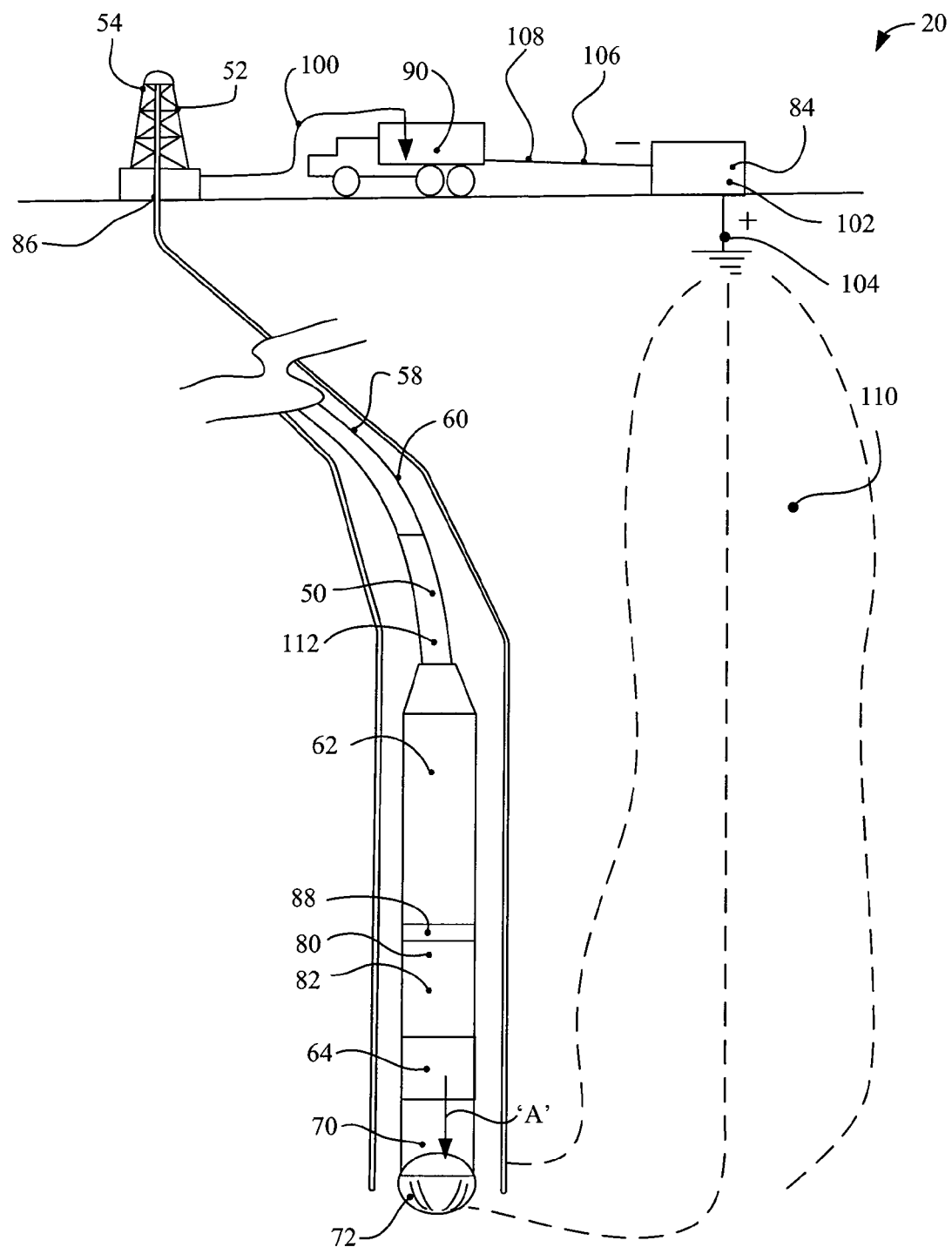
FIG. 2 is a view of an end portion of a drill string of the drill rig of FIG. 1.

Considering FIGS. 1 and 2, which are not drawn to scale, and which is intended to convey conceptual understanding, by way of a broad, general overview and only for the purposes of illustration, a geological formation is indicated generally as 20. Geological formation 20 may include a first mineral producing region 22, and a second mineral producing region 24 (and possibly other regions above or below regions 22 and 24). Region 22 may be below region 24, possibly significantly below. For example, region 22 may generally lie perhaps 1000-7000 m below the surface, whereas region 24 may tend to lie rather less than 1000 m from the surface.

Region 22 may include one or more pockets or strata 23, 25 that may contain a fluid that is trapped in a layer 26 by an overlying layer 28 that may be termed a cap. The cap layer 28 may be substantially impervious to penetration by the fluid. In some instances the fluid in layer 26 may be a mixture having a significantly, or predominantly, hydrocarbon based component, and may include impurities whether brine, mud, sand, sulphur or other material which may be found in various types of crude oil. It may also include hydrocarbon gases, such as natural gas, propane, butane, and so on, and various impurities as may be. The fluid may be under low, modest, or quite high pressure. The vertical through thickness of the potential or actual production zone of region 22 may be of the order of less than 10 ft, to several hundred feet, or perhaps even a few thousand feet. The overburden pressures in this zone may be quite substantial, possibly well in excess of 10,000 psi.

Region 24 may include one or more mineral bearing seams, indicated generally as 30, and individually in ascending order as 32, 34, 36, and 38. It may be understood that FIG. 1 is intended to be generic in this regard, such that there may only be one such seam, or there may be many such seams, be it a dozen or more. Seams 32, 34, 36, and 38 are separated by interlayers indicated generally as 40, and individually in ascending order as 42, 44, 46, and an overburden layer 48 (each of which may in reality be a multitude of various layers), the interlayers and the overburden layer being relatively sharply distinct from the mineral bearing seams 30, and relatively impervious to the passage of fluids such as those that may be of interest in seams 32, 34, 36 and 38. It may be noted that seams 30 may be of varying thickness, from a few inches thick to several tens of feet thick. Seams 30 may, for example, be coal seams.

In one example, there may be a drill string 50, that extends from head end apparatus 52, which may be a drill rig 54 or a drilling truck, or similar equipment. In directional drilling, the drill bit may typically be mounted at the end of a coil that is conveyed down the bore from a drill rig located at the surface. The drill string is most typically 3½, 4, 4½, or 5 inches in diameter, and is made of sections of hollow pipe, usually ½ inch thick. Cleaning fluid, in the nature of water or drilling mud is forced down the inside of the hollow drill string under pressure, and flows back up the generally annular space about the drill string, and back to the surface. The deeper the well, the higher proportion of drilling mud as opposed to water. The drilling mud is driven by pumps, which are usually duplex or triplex pumps. In this example, the drill string may include conveying pipe 58 that is hollow, and through which drilling mud is pumped under pressure. There may be a regular pipe region 60, and a drill collar region 62. A drill string may have a very high aspect ratio of length to diameter, and a certain overall springiness or resilience both longitudinally and torsionally. The lower end of the drill string may include a number of sections of drill collars. Drill collars are often thick walled steel pipe sections about 30 ft long, and may have an inside diameter of 2¼ or 2½ inches, and an outside diameter of 5 or 6 inches. A drill string may have e.g., 18 or 24 such drill collars at the bottom end. These drill collars may tend to function somewhat like a plumb bob.

A mud motor 64 may be mounted at the downhole end of drill string 50. In one embodiment, the mud motor may have an inlet for drilling mud, a torque conversion section, which may include a helical impeller, or similar device, which impeller may drive an output shaft 70. A drill bit 72 may be rigidly mounted to the end of output shaft 70, so that when shaft 70 turns, drill bit 72 also turns. The mud motor body 74 is rigidly mounted to the end of the drill string. In this embodiment mud motor body 74 is a stator, having the same angular orientation about the longitudinal axis of the drill string as does the end of the drill string to which it is mounted. I.e., there is no relative rotation between the two. Output shaft 70 is hollow, and carries drilling mud in the direction of arrow 'A' to bit 72. For the purposes of our discussion, drill bit 72 will be assumed to include directional steering apparatus, and a steering signal receiving and actuating apparatus of conventional design.

In one embodiment of an aspect or aspects of the present invention there is an apparatus 80 for, or a method of, obtaining telemetry information from a well bore telemetry tool 82, using a very low frequency (that is, in the range of less than 100 Hz, and in one embodiment the narrow range of less than 10 Hz) alternating current carrier current, or, in one embodiment, a direct current carrier current. Alternatively, the carrier current may included a direct current component and an alternating current component. Apparatus 80 is mounted between drill collars 62 and mud motor 64. Telemetry tool 82 may be an assembly that includes various sensors, as noted above and in the prior art, a small internal electrical power supply such as batteries, and an output sending signal generator or signal modulator, indicated as 88, connected to superimpose that output signal on the carrier current or to modulate the carrier current, as may be. This internal power supply may be of a conventional nature.

The carrier current may have a source, such as a generator or other power supply, indicated generically as 84, located remotely from the well bore telemetry tool 82. That is, power supply 84 is an external power supply. The carrier current source may be located in a relatively convenient location, such as at the surface, perhaps in the neighborhood of, or at, the well head 86. The carrier current from the current source 84 provides a medium, or media, for carrying an information signal from a sending station, or sending device located at, or that is part of, telemetry tool 82 to a receiving station 90 some distance away. Signal generator 88 superimposes an information carrying signal on the carrier current. That information carrying signal may be a time varying signal, whether that signal is an amplitude modulated sinusoid, a frequency modulated sinusoid, a phase shift modulated sinusoid, a digitally generated modulated square wave, pulse train, or other codes signal sequence, whether based on a modulated periodic signal or an asynchronous signal. That signal carries encoded information obtained from the sensors of telemetry tool 82, those sensors including attitude sensors (azimuth angle, dip) and other environmental or process sensors (temperature, pressure, acceleration, velocity) and so on. The receiving station 90, which may be a mobile communications truck, may also be located at the surface, as at well head 86, or at another more distant location, as may be, and may include signal processing circuitry operable to strip, or extract, or observe, the information transporting or carrying signal from the underlying carrier current. The main power supply 84 and the receiving station 90 may be mounted at the same location, whether in a fixed station or in a mobile unit, or may be separate. They are shown separately for conceptual explanation. It may be that where horizontal drilling occurs, the main power supply, or, perhaps more precisely, the location at which the main power supply has probes driven into the ground, may be quite some distance from the wellhead. For example, the bit may be operated at a depth of 500 or 1000 m from the nearest surface, but may have an horizontal location that is 1 or 2 (or perhaps more) km away from the well head. The probes by which main power supply 84 (and perhaps main power supply 84 itself) may be rather closer to the horizontal location of the drill bit than to the well-head such that the current enters the ground at, or relatively near to, the most proximate location to the drill bit.

In that embodiment, the apparatus and the geological formation may co-operate to define a current carrying path, or loop, or circuit, identified notionally as 100. The carrier current source 102 (e.g. power supply 84) may be thought of as the beginning and end of the path or loop. One terminal or pole 104 of the carrier current source feeds current to the geological formation. The terminal of opposite polarity 106 is connected to the signal processing line return 108. The geological formation defines a first portion of the current conductor path, identified generically as 110. Geological formation 20 is a conductor of relatively large effective cross-sectional area, many times greater than the cross-section of drill string 50. Current from geological formation 20 may tend to be carried into the drill string predominantly or preferentially (if not almost exclusively) at the drill bit end. Drill string 50 is, relatively speaking, a low resistance, high electrical conductivity path directly to the surface. The gap between drill-string 50 and the bore wall is, again, relatively speaking, predominantly an electrical insulator, or relatively high resistance path as compared to the drill string itself. That is, even if the flow of drilling mud, which is predominantly water, is considered to be analogous to quite salty brine, it may have an electrical conductivity in the range of, perhaps, 1 to 5 Siemens/meter (or, if less salty, possibly as little as 0.05 Siemens/meter). By contrast, mild steel such as might be used in the drill string, may have an electrical conductivity of the order of 500,000 to 600,000 Siemens/meter. Therefore, while there may be some electrical leakage into the drill string from the bore wall across the water filled gap along the entire length of the drill string, nonetheless it may be expected that the dominant portion of the carrier current will pass into drill bit 72 and run upwardly past (or through) the telemetry apparatus, namely telemetry tool 82, and on up drill string 50 to receiving station 90 at the surface.

While a dedicated electrical wiring harness and connector apparatus may be used, in one embodiment the apparatus relies only upon the electrical conductivity of drill string 50 itself and does not employ specialised connector fittings. Thus, in this leg 112 of the electrical path the return current, or a predominant portion or majority thereof, as it may be termed, collects or flows into drill string 50 below telemetry tool 82. That is, the path of the carrier current includes the path along, or through, telemetry tool 82, at which the information signal is added to the carrier signal. The carrier signal runs upward along drill string 50 to the information signal receiving unit 90, where the information signal is observed. Finally, the current path runs back to the carrier signal source to complete the loop. Telemetry tool 82 may either superimpose a time varying signal on the carrier current, or it may modify the carrier current, whether by time variable resistance, capacitance, inductance, or some combination of two or more of them to yield a time varying signal. The detection equipment (e.g., receiving station 90 at the well head) then receives and decodes the resultant combined or modified current, and decodes the information that rides on top of the carrier current. The decoded information is then analysed and suitable steering instructions are transmitted back down to drill bit 72 accordingly. Drill bit 72 then steers in the customary manner.

In this description, it is understood that telemetry apparatus 80 employs a first or internal power source, such as batteries or a generator (e.g., driven by drilling mud flow), and a second or external power source, that may be placed near the surface of the ground whether in a truck or doghouse, that is relatively easily accessible, as described above. The technique of employing an external power supply to generate a relatively large carrier current may tend to allow for the reduction of the power requirement of the MWD tool located downhole. A relatively small battery inside the downhole tool may then tend to be sufficient to function to provide the variable information signal to be transmitted to the well head. This may tend to overcome, or in some way address the problem of downhole power consumption that tends typically to be a factor limiting telemetry tool operation.

Although the description has been made in terms of the transmission of an information signal encoding the observations of monitors for directional angle (N, S, E, W, etc.) dip angle, temperature, pressure, and so on, the apparatus can also be used to carry instruction signals back to the drill bit.

Inasmuch as the instruction signal is provided from the surface, the need to employ a relatively high power signal sending device is less problematic. However the carrier current may still provide an avenue for the instructional signal.

The carrier current is significantly larger than the signal current in terms of order of magnitude. That is, the current source may produce a carrier current of quite significant power at the emitting device, perhaps 2-20 kW. This may yield a current of perhaps 0.5 to 1.0 amps, or, generally, something in the range of up to 2 or 3 amps. The peak signal current may be much, much smaller. It may be of the order of 1-20 mA. The total power of the information carrying signal may have a total power of 1-10 W, or less. As such, the majority of the power is supplied from outside the telemetry module at the bottom end of the drill string. This means that only a relatively small power supply is required at the telemetry device.

As noted above, where an electrical system is employed, the power consumption of the MWD tool, or tools, tends to be one of, if not the most important of, the factors limiting the function of the tool in operation. The carrier current provided from the remote power source performs two functions. First, it provides a transmission medium, or media. Second, it provides the energy required for propagation of the signal through the geological formation and the drill pipe. As such, the downhole energy requirement of the telemetry tool itself is significantly reduced, that is, it may be limited only to the energy required to place the signal onto the carrier current. It may be provided with a relatively small battery pack for this purpose. Comparatively speaking, this telemetry system involves relatively simple construction, and may be relatively inexpensive to build and maintain. The rate of signal transmission, and the speed at which the signal travels up (and down) the drill string may tend to be quite high as compared to the flow of information in, for example, a pressure pulse in drilling mud.

Recapping the description, a telemetry tool, or assembly, 80, is placed in a drill string adjacent to a drill bit 72. Telemetry tool 80 includes position and direction sensors, a power supply, a signal receiver and a signal emitter. An external base unit, may be mounted on the surface at some distance from the wellhead. The external base unit generates, and transmits into the geological formation, a carrier signal. The carrier signal may be a DC carrier signal, and it may be a variable DC signal.

The base unit also has a receiving unit, which may have the opposite DC voltage to that of the carrier signal emitting unit. The geological formation provides a large current path between the carrier current generating unit and the downhole end of the drill string. The carrier current, or some portion thereof, is received at the telemetry unit. The drill string defines a relatively low resistance conductor for the return signal. Thus a circuit is established from the base unit, through the geological formation to the telemetry unit, and back up the drill string to end back at the base unit.

Alternatively, where there is an extant well bore 120 in the neighbourhood of the new well bore, and that well bore has either a metal casing wall or a metal drill string or other relatively electrically conductive element located therein, the external power source may be connected to a conductor that carries the current to a point down the neighboring well bore, and the carrier current is emitted from that location (which may be the foot of the neighboring well bore) into the surrounding geological formation.

In either case, the telemetry unit superimposes a time varying signal on the carrier current. The time varying signal includes a recognition sequence, followed by a data string. The data string may include information pertaining to compass direction, azimuth dip, rotational speed, acceleration in any of three axes, and so on. The base unit strips the signal off the carrier current, and reads the code. This system may tend to permit the telemetry tool to operate at relatively low power. The relatively high power carrier current is provided by the base unit.

Figure 3:
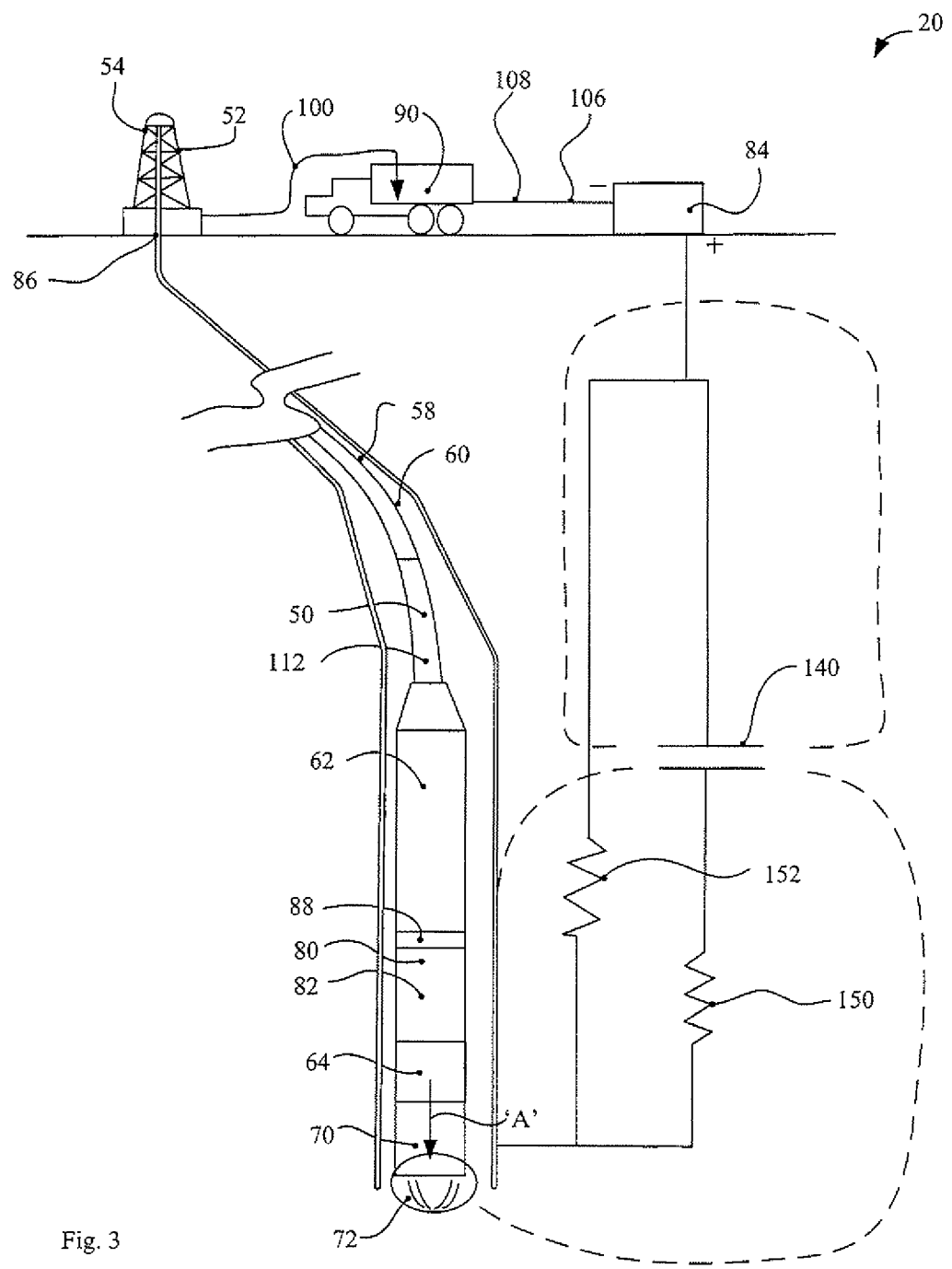
FIG. 3 is an alternate representation similar to that of FIG. 2, depicting an alternate embodiment of drill rig downhole telemetry apparatus.

The embodiment of FIG. 3 is substantially similar, and may use the same, or substantially the same physical apparatus as the embodiment of FIG. 1. However, in this embodiment the geological formation may not tend conceptually to resemble a large current conductor so much as a large capacitor. It may be that the power source may apply, for example, a positive dc voltage to the drill string. Over time this may cause a large charge to be accumulated in the geological structure in the vicinity of the drill bit. At some point the application of this voltage may cease, and the formation may be permitted to discharge through bit 72 and drill string 50. Once again, the time varying telemetry signal is imposed on the discharging signal. In essence, this method is similar to charging an RC circuit, and then monitoring the discharge current as the capacitor, conceptually item 140, discharges through the resistor, conceptually item 150 representing the resistance of the geological formation, and 152 representing the resistance of the drill string. It may be that the charging period is determined by measuring current flow during charging, and ceasing the charge when the current flow decreases from an in initial flow to a cut off flow, the cut off being, perhaps, one half, one third, one quarter or one tenth of the initial flow. It may be that rather than merely cutting the initial voltage to zero, the initial voltage may be reversed, for example to a negative dc voltage of the same or different magnitude. The voltage may then be reversed periodically in a series of charging and discharging phases or pulses, yielding decaying voltage and current transients as the carrier current. The exponential decay time constants for these RC circuits may be of the order of 5 or 10 or 20 minutes. The method may then have the appearance of charging the formation over time with a series of pulses, and then watching the discharge. Although this might not be thought of as an ac circuit, or system, the applied voltage that yields the series of pulses, (which include a first pulse, a second pulse, and so on), may amount to a very low frequency square wave. The pulses themselves may have the form of exponential decay function that may yield a shark-fin, or saw-tooth current v. time or voltage v. time plot. The charging and discharging portions may not be equal. For example, a charging pulse may use very high voltage (of the order of a thousand, or a few thousand volts) applied for 10, 20 or 30 seconds, and discharge may last 10, 20 or 30 minutes. Discharge may be followed by another charging pulse, and so on. Although this description has been made in the context of superimposing a data signal on a carrier signal defined by the current discharge, the data signal may also be superimposed on a carrier signal defined by the charging current. That is, the data transmission signal can be sent during charging, discharging, or both.

Thus, in this embodiment, a telemetry tool, or assembly, 80, is placed in a drill string adjacent to a drill bit 72. Telemetry tool 80 includes position and direction sensors, a power supply, a signal receiver and a signal emitter. An external base unit, may be mounted on the surface. The external base unit generates, and transmits into the geological formation through the drill string, an initial charging signal or pulse that charges up the surrounding geological formation. The charging stops, or reverses, such that the geological formation then discharges back through the drill string to define a carrier signal, which may be a decaying signal, and which may be, or approximate, an exponential time decay signal. As such, the carrier signal may be a DC carrier signal, and it may be a time varying (i.e., decreasing in magnitude) variable DC signal. The sending unit, i.e., the telemetry sending module, adjacent to the drill bit at the downhole end of the drill string places a time varying information data signal on the carrier signal.

In summary, the geological formation is used as a capacitance. Charging and discharging pulses define carrier currents. A data signal is imposed on the carrier current. Data transmission occurs on one or both of the charging or discharging carrier current pulses.

The apparatus also includes a receiving unit, the telemetry receiving module, mounted to monitor the carrier current and superimposed information signal, as previously described. The geological formation acts as a capacitor at the downhole end of the drill string for receiving charge from the carrier current generating unit. The carrier current passes back up the drill string through the telemetry sending unit. The drill string defines a relatively low resistance conductor for the return signal.

The tendency of the geological formation to behave like a capacitor may vary from location to location. In some embodiments the geological formation may behave much less like an ideal capacitor, and more like a device that is in part like a capacitor, and in part like a resistor, such that it may resemble what might be termed a "leaky capacitor". In this instance there may be something of a current path between the grounding of the main power source and the drill bit, represented conceptually as resistor 160, but there may also be a significant capacitive component as noted above. A charging voltage may be applied. After a period of time the voltage is reversed to take advantage of a discharge effect in the formation.

In each case, whether fed directly into the surrounding formation at the surface or through the drill string, the use of a large carrier current, typically hundreds if not thousands of times larger in magnitude, whether measured by peak voltage amplitude, current draw, or power, or pulse, of charging or discharging, provides in an electrical sense a road or path, or "carrier" that improves the transmission of a very small information carrying signal. This low resistance, or low attenuation path, or carrier, however it may be termed acts as a medium that permits the small information signal to pass without the very severe attenuation that might otherwise tend to obliterate the signal if no carrier current were present. The listening or receiving sensor at the far end, i.e., at or adjacent to the wellhead, monitors the big, concentrated flow in the low resistance path in which the carried data signal is contained.

Various embodiments have been described. Since changes in and or additions to the above-described examples may be made without departing from the nature, spirit or scope of the invention, the invention is not to be limited to those details.

I claim:

1. A method of transmitting an electrical signal carrying downhole telemetry information from a telemetry sending apparatus located near a drill bit of a drill string, the drill bit being downhole in a well bore formed in a geological formation, the signal being sent from the sending apparatus to a receiving location near a well head of the well bore, the method including:
   establishing in the drill string by use of a current source external to the drill string and elsewhere than downhole, a capacitive pulse, said capacitive pulse being one of (a) a charging pulse; and (b) a discharging pulse; and
   superimposing downhole telemetry data on the capacitive pulse, said method being reliant upon at least one of (a) charging; and (b) discharging, the geological formation as a capacitance.

2. The method of claim 1 wherein the capacitive pulse defines a carrier current having a current magnitude that is more than 100 times as large as the peak current magnitude of the electrical signal.

3. The method of claim 2 wherein the carrier current has a value of greater than 0.5 amps.

4. The method of claim 2 wherein the method includes building up a stored charge in the geological formation adjacent to the drill bit.

5. The method of claim 4 wherein the method includes discharging the geological formation through the drill string, and placing the downhole telemetry data on an electrical pulse associated with that discharge.

6. The method of claim 1 wherein one of (a) said charging pulse; and (b) said discharging pulse includes conducting a decaying electrical charge pulse portion through said drill string, and telemetry data is encoded on said decaying electrical charge pulse portion.

7. The method of claim 1 wherein charge is supplied to the geological formation in a first period of time and discharge occurs over a second period of time; said second period of time is longer than said first period of time; said discharge defines a carrier current, and said telemetry data is placed on said carrier current during said second time period.

8. The method of claim 7 wherein a third period of time and a fourth period of time follow said first and second periods of time; said fourth period of time being longer than said third period of time; charge is supplied to said geological formation in said third period of time, and said geological formation discharges through said drill string in said fourth period of time, and further telemetry data is placed on said discharge during said fourth period of time.

9. The method of claim 8 wherein charging of the geological formation is of a first polarity during said first period of time, and charging of said geological formation is of a second, opposite, polarity during said second period of time.

10. The method of claim 1 wherein said charging and discharging is by direct current.

11. The method of claim 1 wherein said charging and discharging is by very low frequency alternating current of less than 10 Hz.

12. A well signal transmission apparatus comprising the combination of a drilling rig, a power source, and a telemetry module wherein:
   the drilling rig includes a drill string having a first end at a well head, and a second end distant therefrom down a well bore formed in a geological formation, there being a drill bit at said second end, the drill string defining a continuous electrical conductor running from the drill bit to the well head;
   the power source being elsewhere than downhole, and being connected to supply a capacitive charge to the geological formation;
   said telemetry module being located downhole along said continuous electrical conductor adjacent to said drill bit;
   said transmission apparatus having at least one of
   (a) a first mode of operation, in which said apparatus passes capacitive charge previously accumulated in the geological formation to discharge through said drill string in a capacitive discharge current when said power source is no longer charging the geological formation; and in which first mode the telemetry module is connected to place encoded data on at least one such capacitive discharge current; and (b) a second mode of operation, in which said apparatus passes capacitive charge current from said power source and into the geological formation through the drill string; and in which second mode said telemetry module is connected to place encoded data on at least one such capacitive charge current; and said apparatus includes a receiver located closer to the well-head than to the drill bit, the receiver being connected to observe said encoded data.

13. The telemetry apparatus of claim 12 wherein said power source is one of:
    (a) a direct current power source; and
    (b) a time varying power source having a frequency of less than 100 Hz.

14. The telemetry apparatus of claim 12, wherein the power source is connected to pass capacitive charge into the geological formation from a downhole location in another well bore.

15. The telemetry apparatus of claim 12 wherein said telemetry module includes batteries, said batteries providing a power source used in generating said information carrying signal; and said batteries define a down hole power source less powerful than said power source located elsewhere than downhole.

16. A method of obtaining wellbore telemetry information from a well bore telemetry tool, said method comprising:
    establishing, in combination, the telemetry tool, a drilling rig and a power source; the drilling rig having a well head and a drill string extending from the well head down a borehole in a geological formation, the drill string including a drill bit distant from the well-head down the borehole, the drill string defining a continuous electrical conductor running from the drill bit to the well head; the power source being elsewhere than downhole, the telemetry tool being located downhole along said continuous electrical conductor closer to the drill bit than to the well-head; and at least one of
    (a) discharging previously accumulated capacitive charge in the geological formation through said drill string in a capacitive discharge current when said power source is no longer charging the geological formation;
    placing telemetry data from the telemetry tool on said capacitive discharge current as said capacitive discharge current passes along said drill string; and
    at a location up the well bore nearer to the well head than to the drill bit, receiving said data sent from the telemetry tool; and
    (b) permitting capacitive charge current from said power source to pass down the drill string and into the geological formation when said power source is charging the geological formation through the drill string;
    placing telemetry data from the telemetry tool on said capacitive charge current as said capacitive charge current passes along said drill string; and
    at a location up the well bore nearer to the well head than the drill bit, receiving said data sent from the telemetry tool.

17. The method of claim 16 wherein the method includes successive steps of charging and discharging the geological formation, those successive steps including at least a first pulse and a later second pulse, and said method includes placing data on said first pulse and placing additional data on said second pulse.

18. The method of claim 17 including reversing the polarity of successive pulses.

19. The method of claim 18 wherein the reversing occurs at less than 10 Hz.

20. The method of claim 16 wherein said method involves both charging and discharging of the geological formation, and the charging of the geological formation is more rapid than the discharging of the geological formation.

21. The method of claim 16 wherein the data signal is transmitted at a power of less than 10 W, and the power source is operated at a power of more than 2 kW.

22. The method of claim 16 wherein said method includes locating the power source at the well head of the well bore.

23. The method of claim 16 wherein the method includes conducting the capacitive charge down a neighboring well bore and into the geological formation.

* * * * *